Sept. 13, 1955

R. L. BOND III 2,717,818

SLIDE-IN, PEDESTAL TYPE RADIO CHASSIS

Filed Sept. 9, 1952

INVENTOR.
RUFUS L. BOND, III
BY
McMorrow, Berman + Davidson
ATTORNEYS.

2,717,818
Patented Sept. 13, 1955

2,717,818

SLIDE-IN, PEDESTAL TYPE RADIO CHASSIS

Rufus Loomis Bond III, Montreal, Quebec, Canada

Application September 9, 1952, Serial No. 308,586
2 Claims. (Cl. 312—7)

This invention relates to an improved radio chassis, and a primary object of the invention is to provide a more simple and practical radio chassis which can be assembled with or disassembled from an associated cabinet with greater ease and speed.

Heretofore, a substantial amount of surplus metal has been embodied in a conventional radio chassis, and it is further a characteristic of conventional chassis construction that the chassis cannot be mounted in or removed from an associated cabinet with a desirable amount of facility. As a result, when a radio needs repair, an excessive amount of time and effort is required, to remove the chassis to an extent sufficient to permit its being worked upon.

An important object of the present invention, accordingly, is to provide an improved chassis construction which is specifically designed to permit the chassis to be mounted in a radio cabinet, merely by being slid into the cabinet, the chassis being held in proper position by novelly formed pedestals associated therewith, and by a single pair of holding screws cooperating with said pedestals in retaining the chassis in proper position relative to the cabinet.

Another object of importance is to provide a chassis of the character stated which will be so formed as to achieve the desirable results noted above, while at the same time being formed of less metal than is ordinarily required in chassis manufacture.

Another object of the present invention is to provide a chassis construction which is so formed as to permit the invention to be applied to chassis of various sizes and types.

Another object of importance is to provide a chassis which will be so designed as not to cause interference with normal operation of the radio mounted thereon.

Still another object of the invention is to provide a chassis which will be so formed as to achieve the several desirable objects set forth above, while still being capable of manufacture at very low cost.

Other objects will appear from the following description, the claims appended thereto, and from the annexed drawing, in which like reference characters designate like parts throughout the several views, and wherein:

Figure 1:
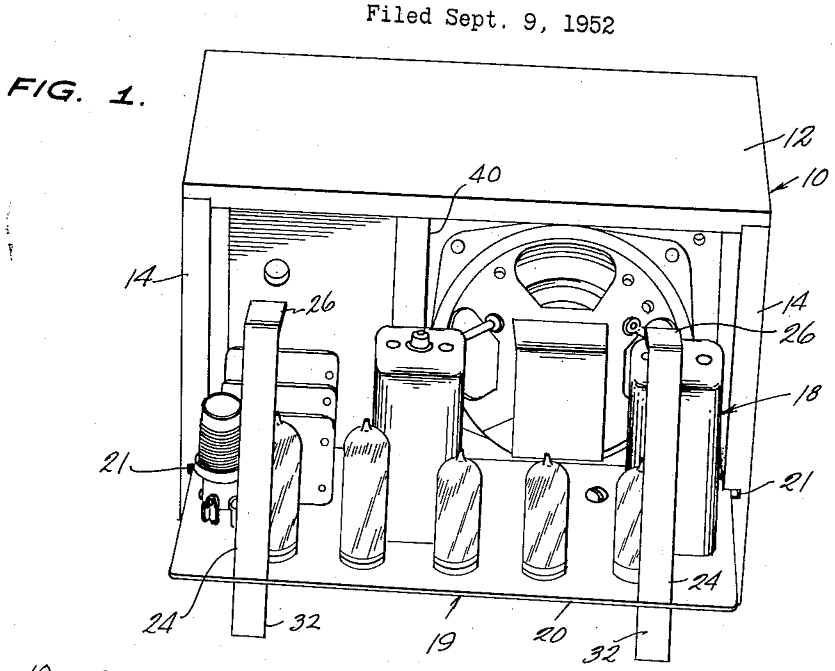
Figure 1 is a rear perspective view of a radio set in which is embodied a chassis formed in accordance with the present invention, the chassis being partially removed.

It should be noted that although the chassis formed in accordance with the present invention has been illustrated in the drawing as the chassis of a radio receiver, said chassis could, without departure from the spirit of the invention, be used in transmitters, television receivers, and any other type of radio apparatus in which the components of the apparatus are mountable upon a chassis disposed within a cabinet.

In the illustrated embodiment of the invention, a cabinet has been designated generally by the reference numeral 10, said cabinet being of box-like formation and being closed at its ends, top, and bottom, the front of the cabinet also being closed. The rear of the cabinet is open, but could be closed by a removable closure panel, if desired.

The cabinet 10 includes a flat top wall 12 fixedly connected, along its opposite ends, to the upper edges of end walls 14, said end walls being fixedly connected, along their bottom edges, to the opposite ends of a flat bottom wall 16 disposed in parallel relation to the top wall.

Mounted within the cabinet are conventional radio receiver components designated generally by the reference numeral 18, namely, a speaker, a selected series of tubes, a tuning condenser, and output and input transformers. Other components are not mentioned herein. It is important to note that the several components of the receiver are all carried by the chassis, with the possible exception of the speaker, which can be secured to the inner surface of the front wall of the cabinet 10.

The chassis constituting the present invention is designated generally by the reference numeral 19, and includes a rectangular chassis plate 20, said chassis plate being formed from a flat sheet of cadmium or like material. The opposite end edges of the chassis plate are slidably extended into opposed, inwardly facing grooves 21 provided in the end walls 14 of the cabinet 10 and extending from back to front of the cabinet on a level near to but spaced above the bottom wall 16.

Figure 2:
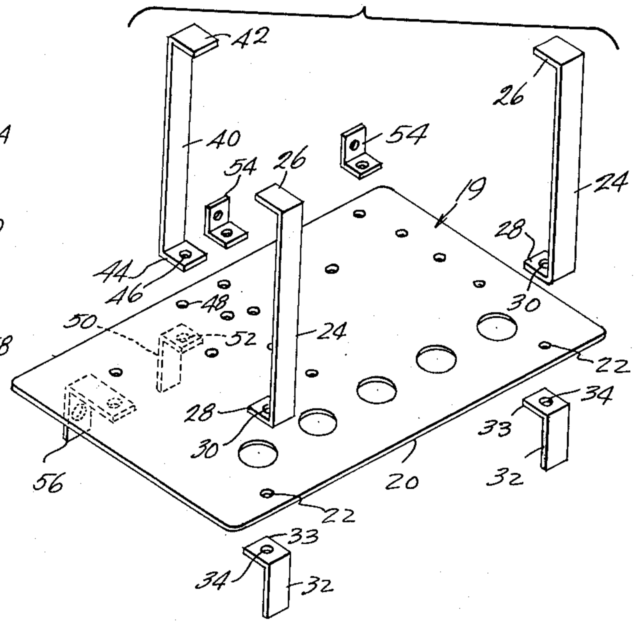
Figure 2 is an exploded perspective view of the chassis per se.

Shown in Figure 2, the chassis plate is formed with any suitable number of large and small openings, arranged as desired to accommodate the several radio set components, said chassis plate having drilled apertures receiving fastening elements whereby other components of the apparatus can be secured thereto.

So far as the present invention is concerned, it is mainly important to note that the chassis plate 20 has formed therein, adjacent its opposite ends, holes 22 spaced inwardly a short distance from the back edge of the chassis plate as best shown in Figure 2. Upper rear pedestals 24, a pair of which are provided, are formed from suitable lengths of cadmium material, said pedestals extending vertically and being formed, at their upper ends, with laterally inwardly extending horizontally disposed ears 26. At their lower ends, the rear pedestals 24 are formed with laterally inwardly extending ears 28, ears 28 having apertures 30 registering with the apertures 22 of the chassis plate.

Rear feet 32 are formed from short lengths of cadmium material or the like having laterally inwardly extended ears 33 at their upper ends formed with apertures or holes 34 registering with the apertures or holes 22, 30.

Figure 3:
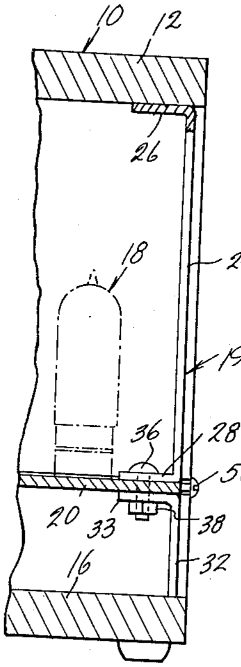
Figure 3 is a fragmentary, transverse sectional view through the rear portion of the cabinet, taken at one side of the cabinet, the chassis being fully inserted within said cabinet.

Bolts 36 extend through the registering holes 22, 30 and 34, and nuts 38 are applied thereto as shown in Figure 3, to secure the pedestals 24 and the feed 32 to the chassis plate. Each rear pedestal 24, as will be noted, is aligned with an associated foot 32.

When the chassis plate is slidably positioned within the grooves 21, the lower ends of the rear feet 32 rest upon the bottom wall 16 of the cabinet 10, the ears 26 of the rear pedestals then being engaged frictionally against the upper or top wall 12 of said cabinet.

The invention also includes front pedestals there being provided a front pedestal 40 having, at its opposite ends, laterally inwardly directed ears 42, 44 respectively. The ear 44 of the upper front pedestal has an aperture 46, registering with an aperture 48 formed in the chassis plate 20, adjacent the front edge of said chassis plate.

A front foot 50 is aligned with the pedestal 40, and has, at its upper end, a rearwardly extended ear 52 formed with an opening registering with the openings 46, 48. Bolts or equivalent fastening elements are extended through the registering openings 46, 48, to secure the pedestals 40, 50 at the front edge of the chassis plate.

The chassis constituting the present invention also has, in the illustrated embodiment of the invention, speaker mounting brackets 54, said brackets being of L-shaped formation, with the respective legs of each bracket being apertured for connection of the bracket to the chassis and speaker respectively. Additionally, the chassis has, at one end, a depending volume control mounting bracket 56, said bracket being of inverted L-shaped formation and being secured to the underside of the chassis plate. The fastening element whereby the volume control mounting bracket 56 is attached to the chassis plate can also be used to attach the tuning condenser of the radio set to said plate.

To secure the chassis in place, and the radio components carried thereby, within the cabinet 10, it is merely necessary that the chassis be slidably inserted in the respective grooves 21 of the cabinet end walls 14. When the chassis plate has been fully inserted, wood screws 58 are threaded into the rear ends of the grooves 21, as shown in Figure 3, so as to cause the shanks of said wood screws to engage against the rear edge of the chassis plate 20. As a result, the chassis plate 20 is held against accidental removal from the cabinet 10.

When the chassis plate has been inserted in this manner, the ears 26, 42 of the pedestals will frictionally engage the underside of the top wall 12 of the cabinet, with the feet 32, 50 engaging the bottom wall 16 of said cabinet. The purpose of the pedestals and feet is to reinforce the chassis plate 20, intermediate its opposite ends, thus to cause the chassis plate to remain wholly flat when it is disposed within the radio cabinet. Additionally, the pedestals and feet protect the chassis plate, and the radio components carried thereby, during normal use of the radio.

It has been found that there is no interference whatever, from the pedestals and feet, with normal operation of the radio set, and efficient functioning of the set is assured when a chassis formed in accordance with the present invention is used.

It will be readily appreciated that if the radio needs repair, it is merely necessary that the wood screws 58 be removed, after which the chassis can be slid out of the radio cabinet, either partially or wholly, as may be desired. When the repairs have been made, the chassis is reinserted in the grooves 21, and the wood screws 58 are applied once again to hold the chassis within the cabinet.

It is also thought to be an important characteristic of the invention that the chassis permits a reduction in the amount of metal ordinarily used in manufacture of a radio chassis, the sides conventionally provided upon a radio chassis being completely eliminated. This saving is effected without reduction in the amount of rigidity possessed by the chassis, when said chassis is mounted in the radio cabinet.

I believe it is obvious that the size of the chassis plate, and the number of front and rear pedestals associated therewith, can be varied as necessary, depending upon the size and particular type of radio components 18 carried by the chassis.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a radio set chassis, a chassis plate, at least two rear feet having lateral ears engaging the underside of the chassis plate and depending from the chassis plate, rear pedestals rising from the chassis plate in line with said rear feet, said pedestals having lateral ears on their lower ends engaging the upper side of the chassis plate, first common fastening means traversing the rear foot ears, the chassis plate, and the ears on the lower ends of the rear pedestals and securing them together, said rear pedestals having lateral ears on their upper ends, at least one front foot depending from a front part of the chassis plate and having a lateral ear engaging the underside of the chassis plate, a front pedestal rising from the chassis plate in line with said front foot, said front pedestal having a lateral ear on its lower end resting upon the upper side of the chassis plate, and second common fastening means traversing the front feet ear, the chassis plate, and the ear on the lower end of said front pedestal and securing them together, said rear and front pedestals having lateral ears on their upper ends, and said chassis plate having end edges, a cabinet having a bottom wall upon which the front and rear feet rest, a top wall engaged by the ears on the upper ends of the front and rear pedestals, and endwalls provided with grooves receiving the end edges of the chassis plate.

2. In a radio set chassis, a chassis plate, at least two rear feet having lateral ears engaging the underside of the chassis plate and depending from the chassis plate, rear pedestals rising from the chassis plate in line with said rear feet, said pedestals having lateral ears on their lower ends engaging the upper side of the chassis plate, first common fastening means traversing the rear foot ears, the chassis plate, and the ears on the lower ends of the rear pedestals and securing them together, said rear pedestals having lateral ears on their upper ends, at least one front foot depending from a front part of the chassis plate and having a lateral ear engaging the underside of the chassis plate, a front pedestal rising from the chassis plate in line with said front foot, said front pedestal having a lateral ear on its lower end resting upon the upper side of the chassis plate, and second common fastening means traversing the front feet ear, the chassis plate, and the ear on the lower end of said front pedestal and securing them together, said rear and front pedestals having lateral ears on their upper ends, and said chassis plate having end edges, a cabinet having a bottom wall upon which the front and rear feet rest, a top wall engaged by the ears on the upper ends of the front and rear pedestals, and endwalls provided with grooves receiving the end edges of the chassis plate, and screws threaded through the cabinet endwalls and engaging the chassis plate and securing the chassis in place in the cabinet.

References Cited in the file of this patent

UNITED STATES PATENTS

| | | |
|---|---|---|
| 725,851 | Kopp | Apr. 21, 1903 |
| 969,135 | Crabtree | Aug. 30, 1910 |
| 1,135,970 | Lothrop | Apr. 13, 1915 |
| 1,736,883 | Macdonald | Nov. 26, 1929 |
| 1,737,824 | Brower | Dec. 3, 1929 |
| 1,791,783 | Andrews | Feb. 10, 1931 |
| 2,377,432 | Lear | June 5, 1945 |
| 2,461,157 | Holden | Feb. 8, 1949 |
| 2,581,967 | Mitchell | Jan. 8, 1952 |

FOREIGN PATENTS

| | | |
|---|---|---|
| 331,496 | Great Britain | July 1, 1930 |